United States Patent
Jang

(10) Patent No.: US 7,143,372 B2
(45) Date of Patent: Nov. 28, 2006

(54) APPARATUS MEASURING SYSTEM-ON-A-CHIP EFFICIENCY AND METHOD THEREOF

(75) Inventor: Hye-on Jang, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 230 days.

(21) Appl. No.: 10/959,050

(22) Filed: Oct. 7, 2004

(65) Prior Publication Data

US 2005/0102445 A1    May 12, 2005

(30) Foreign Application Priority Data

Oct. 8, 2003    (KR) .............. 10-2003-0069785

(51) Int. Cl.
*G06F 17/50* (2006.01)

(52) U.S. Cl. .............................. 716/4; 716/5

(58) Field of Classification Search ............ 716/1, 716/4–5, 18
See application file for complete search history.

(56) References Cited

U.S. PATENT DOCUMENTS

| | | | | |
|---|---|---|---|---|
| 6,427,224 B1 * | 7/2002 | Devins et al. | ................. | 716/4 |
| 6,694,488 B1 * | 2/2004 | Raghunathan et al. | ......... | 716/1 |
| 6,725,432 B1 * | 4/2004 | Chang et al. | ................. | 716/4 |
| 2003/0009730 A1 * | 1/2003 | Chen et al. | .................. | 716/5 |

* cited by examiner

*Primary Examiner*—Paul Dinh
(74) *Attorney, Agent, or Firm*—Sughrue Mion, PLLC

(57) ABSTRACT

An apparatus and a method for measuring the efficiency of a system-on-a-chip (SoC). The SoC efficiency measuring apparatus includes a storage to store information about each of intellectual properties (IP) embedded on the SoC, a receipt efficiency calculator to set an IP corresponding to information stored in the storage as a source IP and to calculate a receipt efficiency from the source IP based on the information about the source IP, a transmission efficiency calculator to set an IP corresponding to information stored in the storage as an object IP and to calculate a transmission efficiency to the object IP based on the information about the object IP, and a displayer to display the efficiencies calculated by the receipt efficiency calculator and the transmission efficiency calculator. Accordingly, the efficiency of the SoC can be measured before manufacturing.

10 Claims, 3 Drawing Sheets

FIG. 4A

| PACKET SIZE | DEVICE 2510 | UNITS |
|---|---|---|
| 1514 | 93.82 | MBPS |
| 256 | 88.28 | |
| 64 | — | |

FIG. 4B

| PACKET SIZE | DEVICE 2510 | ERROR RATE(%) | UNITS |
|---|---|---|---|
| 1514 | 94.06 | 0.25% | MBPS |
| 256 | 88.57 | 0.29% | |
| 64 | 74.37 | — | |

APPARATUS MEASURING SYSTEM-ON-A-CHIP EFFICIENCY AND METHOD THEREOF

CROSS-REFERENCE TO RELATED APPLICATIONS

This application claims the priority of Korean Patent Application No. 2003-69785 on filed Oct. 8, 2003 in the Korean Intellectual Property Office, the disclosure of which is incorporated herein by reference.

BACKGROUND OF THE INVENTION

1. Field of the Invention

The present invention generally relates to an apparatus for measuring the efficiency of a system-on-a-chip and a method thereof. More specifically, the present invention is directed to an apparatus and a method for measuring the efficiency of a system-on-a-chip that can be operated on a platform having an Ethernet DMA (Direct Memory Access) and a bus configuration.

2. Description of the Related Art

As demand for electronic devices, such as TV sets, refrigerators, mobile phones, PDAs (Personal Digital Assistant), and laptop computers, increases, electronic circuits are required to be micro-sized and have low-power consumption.

Furthermore, the development of the semiconductor manufacturing technology has contributed to an increase of the number of circuit elements on a single chip. Accordingly, a memory, a microprocessor, and a coprocessor, which have been on individual chips, respectively, can all be embedded on a single chip. Each component embedded on the single chip is referred to as an intellectual property (IP), and a chip composed of a set of IP components is referred to as a system-on-a-chip (SoC).

The concept of the IP has suggested a new idea to semiconductor design in that the existing IPs are reusable in other systems. That is, in designing a SoC, it is not necessary to design every IP to be embedded on a chip. Instead, a desired SoC can be manufactured by installing IPs, which had previously been designed, on a chip. If the IP is reused in such a manner, approximately 50% of the SoC manufacturing is done so that the time for designing the SoC can be reduced by more than half. Efficiency of the SoC manufactured by packaging all the IPs is measured by a SoC efficiency measuring apparatus.

FIG. 1 illustrates a block diagram of a conventional apparatus measuring the SoC efficiency. Referring to FIG. 1, a SoC efficiency measuring apparatus 100 includes a first Ethernet 101, a second Ethernet 103, a controller 105, and a Universal Asynchronous Receiver/Transmitter (UART) 107.

The first Ethernet 101 is connected to a first smartbit 120, and the second Ethernet 103 is connected to a second smartbit 130. The first smartbit 120 is connected with a certain IP (not shown) embedded on the SoC, and the second smartbit 130 is connected with another certain IP (not shown) embedded on the SoC. The first smartbit 120 measures the number of frames per a given time period, transmission time between frames, and Network Address Translation (NAT) efficiency with respect to data received from the certain IP to which the first smartbit 120 is connected. The second smartbit 130 measures the number of frames per a given time period, transmission time between frames, and Network Address Translation (NAT) efficiency with respect to data received from the certain IP to which the second smartbit 130 is connected.

The controller 105 receives the measured values of data received from the certain IPs measured by the first and second smartbits 120, 130 and also data to be transmitted to other IPs. The controller 105 transmits the values measured by the first and second smartbits 120 and 130 to the UART 107.

The UART 107 receives data through a parallel circuit of the SoC efficiency measuring apparatus 100 in a byte unit and converts the data into a single serial bit stream for transmission to a computer 140. The UART 107 also converts the serial bit stream received from the computer 140 into data of a byte unit.

The data, which are measured by the first and second smartbits 120, 130, are transmitted to the computer 140 and displayed on a displayer (not shown) of the computer 140. Then, a user can determine the efficiency of the SoC based on the displayed data.

However, the conventional apparatus for measuring the SoC efficiency can only measure the SoC efficiency if the manufacturing of the SoC has been completed since each of the IPs on the SoC has to be operating. Otherwise, it is not possible to measure the efficiency of the SoC.

In addition, the conventional apparatus requires smartbit testing apparatuses connected to each of the IPs and has to be connected to a computer in order to measure and determine the efficiency. Thus, a lot of apparatuses have to be operating in order to measure the efficiency of the SoC.

SUMMARY OF THE INVENTION

An aspect of the present invention is to provide an apparatus for and a method of measuring efficiency of a system-on-a-chip (SoC) that is capable of measuring the efficiency during the designing the SoC (before the manufacturing).

To accomplish the above aspect and others, the SoC efficiency measuring apparatus includes a storage to store information about each of the intellectual properties (IP) embedded on the SoC, a receipt efficiency calculator to set an IP corresponding to one of the information stored in the storage as a source IP and to calculate a receipt efficiency from the source IP based on the information about the source IP, a transmission efficiency calculator to set an IP corresponding to one of the information stored in the storage as an object IP and to calculate a transmission efficiency to the object IP based on the information about the object IP, and a displayer to display the efficiencies respectively calculated by the receipt efficiency calculator and the transmission efficiency calculator.

According to an aspect of the present invention, the SoC efficiency measuring apparatus includes a controller to calculate a ratio of data received from the source IP to data transmitted to the object IP for a predetermined time period and control to display the calculated ratio on the displayer.

Also, an input unit is included to input information about the respective IPs to be stored in the storage.

An IP setting unit sets the source IP and the object IP corresponding to information stored in the storage. The receipt efficiency calculator and the transmission efficiency calculator calculate the receipt efficiency from the source IP and the transmission efficiency to the object IP, respectively, according to a modeling method, for example, a program implemented by SystemC.

Meanwhile, a system-on-a-chip (SoC) efficiency measuring method includes (a) storing information about each of the intellectual properties (IP) embedded on a system-on-a-chip, (b) setting an IP corresponding to information stored in step (a) as a source IP and calculating a receipt efficiency from the source IP based on the information about the source IP, (c) setting an IP corresponding to information stored in step (a) as an object IP and calculating a transmission efficiency to the object IP based on the information about the object IP, and (d) displaying the efficiencies calculated in steps (b) and (c), respectively.

The SoC efficiency measuring method includes (e) calculating a ratio of data received from the source IP to data transmitted to the object IP for a predetermined time period. Step (d) displays the ratio calculated in step (e).

The SoC efficiency measuring method further includes (f) inputting information about each of the IPs to be stored in step (a).

The SoC efficiency measuring method further includes (g) setting the source IP and the object IP corresponding to information stored in step (a). Steps (b) and (c) calculate the receipt efficiency from the source IP and the transmission efficiency to the object IP according to a modeling method, for example, a program implemented by SystemC.

BRIEF DESCRIPTION OF THE DRAWING FIGURES

These and/or other aspects and advantages of the invention will be readily apparent and appreciated from the following description of exemplary embodiments, taken in conjunction with the accompanying drawing figures, of which:

FIGS. 4A and 4B illustrate the tables of the measurement results of FIG. 3, in which FIG. 4A illustrates results of the conventional method, and FIG. 4B illustrates results of the method according to an embodiment of the present invention.

DETAILED DESCRIPTION OF EXEMPLARY EMBODIMENT

Hereinafter, the present invention will be described in greater detail with reference to the accompanying drawings.

Figure 1:
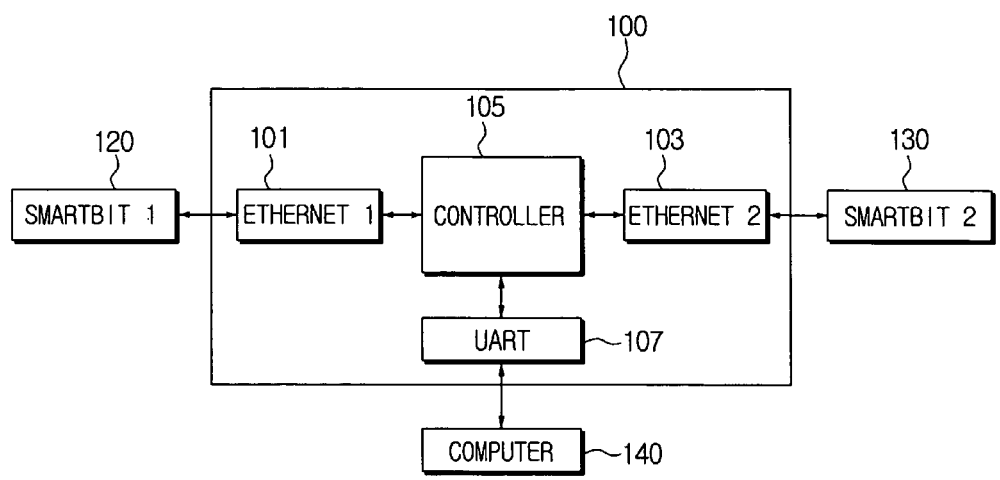
FIG. 1 is a block diagram illustrating a conventional SoC efficiency measuring apparatus.
Figure 2:
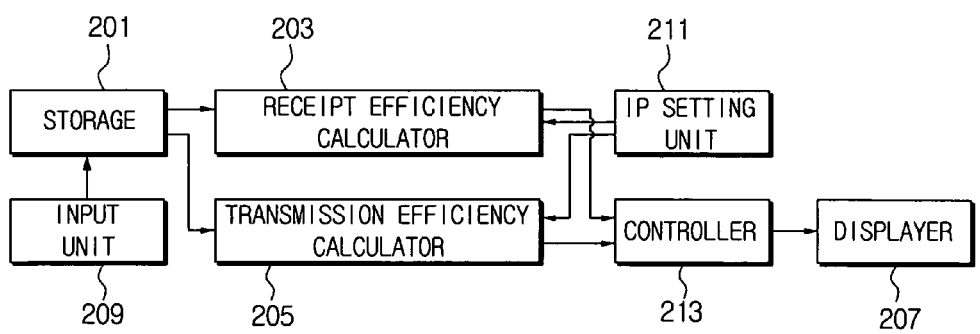
FIG. 2 is a block diagram illustrating a SoC efficiency measuring apparatus according to an embodiment of the present invention.

FIG. 2 is a block diagram of a SoC efficiency measuring apparatus according to an embodiment of the present invention. Referring to FIG. 2, the SoC efficiency measuring apparatus includes a storage 201, a receipt efficiency calculator 203, a transmission efficiency calculator 205, a displayer 207, an input unit 209, an IP setting unit 211, and a controller 213.

The storage 201 stores information on each of the IPs embedded on a system-on-a-chip (SoC). IP refers to each component embedded on the SoC, and the storage 201 stores information about each of the IPs which are pre-manufactured, such as NAT (Network Address Translation) efficiency of a corresponding IP, the number of frames in a given time period with respect to received/transmitted data, and a receipt/transmission time between frames.

The receipt efficiency calculator 203 sets an IP corresponding to one of the information stored in the storage 201 as a source IP and calculates receipt efficiency from the source IP based on the information of the source IP. For example, based on the information of the corresponding IP stored in the storage 201, the receipt efficiency calculator 203 calculates the NAT with respect to the received data. Here, a TLM (Transaction Level Modeling) method by SystemC may be used. The TLM method is a high-level modeling method with respect to digital systems and separately deals with the details of implementation and inter-module communication with respect to a functional unit or a communication mechanism. SystemC, which is an extension of C++, is the combination of SystemC library and C++. Also, SystemC uses a component which is generated by someone as it is and allows communication between the components respectively. For this, it is preferred to generate a value chain between the components respectively.

The transmission efficiency calculator 205 sets an IP corresponding to information stored in the storage 201 and calculates transmission efficiency to the object IP based on information of the object IP. Specifically, the transmission efficiency calculator 205 calculates the NAT with respect to the received data based on the information of the IP corresponding to the information stored in the storage 201, in the same manner as in the receipt efficiency calculator 203. Here, as aforementioned, the TLM method by the SystemC may also be used.

The displayer 207 displays the respective results that are calculated by the receipt efficiency calculator 203 and the transmission efficiency calculator 205. In other words, the displayer 207 displays the NATs calculated by the receipt efficiency calculator 203 and the transmission efficiency calculator 205 so that a user can perceive the efficiency with respect to the source IP and the object IP.

The input unit 209 inputs information of the respective IPs to be stored in the storage 201. For this, it is preferred, but not necessary, that the input unit 207 is configured to have a plurality of input keys to add or update the information of the IPs stored in the storage 201.

The IP setting unit 211 sets the source IP and/or the object IP corresponding the information stored in the storage 201. For this, the IP setting unit 211 may include at least one setting key to allow the user to set the source IP and/or the object IP.

The controller 213 calculates a ratio of data received from the source IP to data transmitted to the object IP for a predetermined time period and displays the calculated ratio on the displayer 207.

Figure 3:
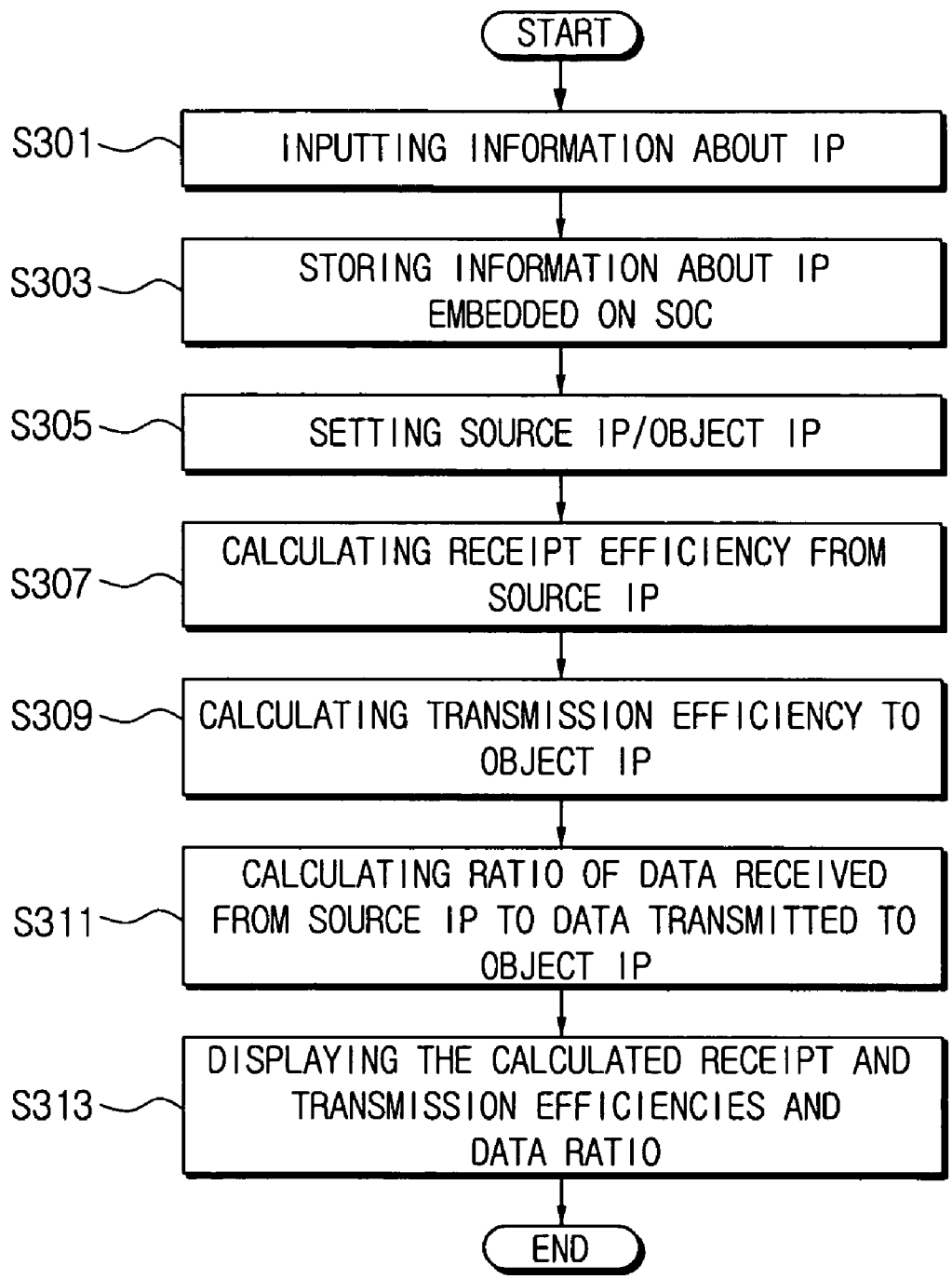
FIG. 3 is a flowchart illustrating an efficiency measuring method of the SoC of FIG. 2.

FIG. 3 illustrates a flowchart of a SoC efficiency measuring method according to one exemplary embodiment of the present invention. Referring to FIG. 3, the SoC efficiency measuring method of the SoC efficiency measuring apparatus is described below.

The user inputs information about the IPs to be embedded on the SoC, which the user desires to design, through the input unit 209 at step S301. Since the SoC is designed using pre-manufactured components, the SoC efficiency measuring apparatus uses known information of the respective components.

The storage 201 stores the information of the respective IPs that are input through the input unit 209 at step S303.

The IP setting unit 211 sets the source IP and/or the object IP corresponding to information stored in the storage 201 at step S305. For this, it is preferred that the IP setting unit 211 is provided with at least one setting key to facilitate the source IP and/or the object IP setting by the user.

The receipt efficiency calculator 203 calculates the receipt efficiency from the source IP based on information, which corresponds to the source IP set by the IP setting unit 211, stored in the storage 201 at step S307. Although the information about the efficiency of the respective IPs are known, the efficiency can change if the respective IPs receive and transmit data with one another. Accordingly, the receipt efficiency calculator 203 calculates the NAT of the data received from the source IP based on the known information about the efficiency of the respective IPs.

The transmission efficiency calculator 205 calculates the transmission efficiency to the object IP based on the information corresponding to the object IP that is set among the information stored in the storage 201 by the IP setting unit 211 at step S309.

The controller 213 calculates the ratio of the data received from the source IP to the data transmitted to the object IP for a predetermined time period at step S311. The calculated ratio is transmitted to the displayer 207.

The displayer 207 displays the efficiencies calculated by the receipt efficiency calculator 203 and the transmission efficiency calculator 205, respectively, and also displays the data ratio calculated by the controller 213 at step S313.

FIGS. 4A and 4B illustrate an example of the results according to the FIG. 3. FIG. 4A illustrates the results according to the conventional method, and FIG. 4B illustrates the results according to an embodiment of the present invention. As shown in FIGS. 4A and 4B, there is no significant difference between the efficiency measured using the modeling method (for example, SystemC), based on the known efficiency information of the IPs, and the efficiency measured after the SoC is manufactured.

According to an embodiment of the present invention, the SoC efficiency measuring apparatus can measure the efficiency of the SoC to be designed even before manufacturing thereby reducing the whole testing time and revision cost with respect to an improperly designed SoC.

Furthermore, since the SoC efficiency measuring apparatus measures the efficiency using by using a software program (for example, SystemC), it is easy to implement functions and to add/delete functions.

Although a few embodiments of the present invention have been shown and described, the present invention is not limited to the disclosed embodiments. Rather, it would be appreciated by those skilled in the art that changes and modifications may be made in this embodiment without departing from the principles and spirit of the invention, the scope of which is defined by the claims and their equivalents.

What is claimed is:

1. A system-on-a-chip (SoC) efficiency measuring apparatus, comprising:
    a storage to store respective information about each of at least one of intellectual properties (IP) embedded on the SoC;
    a receipt efficiency calculator to set an IP corresponding to a respective one of the information stored in the storage as a source IP and to calculate a receipt efficiency from the source IP based on the information about the source IP;
    a transmission efficiency calculator to set an IP corresponding to a respective one of the information stored in the storage as an object IP and calculate a transmission efficiency to the object IP based on the information about the object IP; and
    a displayer to display the efficiencies calculated by the receipt efficiency calculator and the transmission efficiency calculator, respectively.

2. The apparatus of claim 1, further comprising
    a controller to calculate a ratio of data received from the source IP to data transmitted to the object IP for a predetermined time period, and to display the calculated ratio on the displayer.

3. The apparatus of claim 2, further comprising an input unit to input information about the respective IPs to be stored in the storage.

4. The apparatus of claim 3, further comprising an IP setting unit to set the source IP and the object IP each corresponding to one of the respective information stored in the storage.

5. The apparatus of claim 4, wherein the receipt efficiency calculator and the transmission efficiency calculator calculates the receipt efficiency from the source IP and the transmission efficiency to the object IP, respectively, according to a program implemented by SystemC.

6. A system-on-a-chip (SoC) efficiency measuring method, comprising:
    (a) storing respective information about each of intellectual properties (IP) embedded on system-on-a-chip;
    (b) calculating a receipt efficiency from the source IP based on information about the source IP corresponding to a respective one of the information stored in the step (a);
    (c) calculating a transmission efficiency to the object IP based on information about the object IP corresponding to a respective one of the information stored in the step (a); and
    (d) displaying the efficiencies calculated in the steps (b) and (c), respectively.

7. The method of claim 6, further comprising (e) calculating a ratio of data received from the source IP to data transmitted to the object IP for a predetermined time, wherein the step (d) displays the ratio calculated in the step (e).

8. The method of claim 7, further comprising (f) inputting information about each of the IPs to be stored in the step (a).

9. The method of claim 8, further comprising (g) setting the source IP and the object IP each corresponding to one of the respective information stored in the step (a).

10. The method of claim 9, wherein the steps (b) and (c) calculate the receipt efficiency from the source IP and the transmission efficiency to the object IP according to a program implemented by SystemC.

* * * * *